United States Patent [19]

Fukumoto et al.

[11] Patent Number: 4,853,794
[45] Date of Patent: Aug. 1, 1989

[54] METHOD AND IMAGE PROCESSING SYSTEM FOR RECONSTRUCTION OF AN IMAGE

[75] Inventors: Masatoshi Fukumoto, Matsudo; Soichi Kubo, Chiba; Yoichi Miyake, Sakura; Norishige Tsukada, Kashiwa; Kiyoshi Kasutani, Tokyo; Kenji Okamori, Misato, all of Japan

[73] Assignee: Sakata Inkusu Kabushikikaisha, Osaka, Japan

[21] Appl. No.: 124,021

[22] Filed: Nov. 23, 1987

[30] Foreign Application Priority Data

Dec. 1, 1986 [JP] Japan ................................ 61-286351
Dec. 1, 1986 [JP] Japan ................................ 61-286352
Aug. 31, 1987 [JP] Japan ................................ 62-217419

[51] Int. Cl.$^4$ ............................................. H04N 1/40
[52] U.S. Cl. ........................................ 358/447; 382/54
[58] Field of Search ................ 358/284, 280; 364/515, 364/518, 727; 382/54

[56] References Cited

U.S. PATENT DOCUMENTS

| | | | |
|---|---|---|---|
| 4,323,974 | 4/1982 | Sekigawa ............................ | 364/515 |
| 4,356,555 | 10/1982 | Ejiri et al. ......................... | 358/284 |
| 4,360,883 | 1/1982 | Ejiri et al. ......................... | 358/284 |
| 4,437,122 | 3/1984 | Walsh et al. ....................... | 358/284 |
| 4,509,195 | 4/1988 | Nadler ................................ | 358/284 |
| 4,651,287 | 3/1987 | Tsao .................................. | 364/519 |

*Primary Examiner*—Edward L. Coles, Sr.
*Attorney, Agent, or Firm*—Wenderoth, Lind & Ponack

[57] ABSTRACT

A method and image processing system is for reconstruction of an input image. The method for reconstruction of an input image includes a step of inputting image data (for example, densities) of at least two pixels nearest to a position of an additional pixel to be added to the input image and those of neighbor pixels located on extension lines of segments drawn between the position of the additional pixel and that of each of the nearest pixels of which the image data were inputted, and a step of estimating the value of the image data of the additional pixel on the basis of the inputted image data of at least two pair of the nearest and corresponding neighbor pixels by using an improved and simple algorithm which is newly proposed herein and called "linear extrapolation and average method". Further, the improved image processing system for performing the above described method for reconstruction of an input image includes an input portion having a first memory for selecting a desired image from a source of image signals, for effecting A/D conversion of the image signals of the selected image and for storing the A/D converted image in the first memory, an image enhancement portion having a second memory for reading the image data of the pixels of the input image stored in the first memory, for performing image enhancement processes of the input image and for storing the enhanced image in the second memory, a reconstruction processing portion having a reconstruction processing circuit and a third memory for reading the image data of the pixels stored in the second memory and for evaluating image data of additional pixels from the read-out image data by using the "linear extrapolation and average method" in the reconstruction processing circuit and for storing the reconstructed image in the third memory and an output portion for outputting the reconstructed image stored in the third memory.

4 Claims, 9 Drawing Sheets

| | | | |
|---|---|---|---|
| −k | 0 | 0 | −k |
| 0 | k+1 | k+1 | 0 |
| 0 | k+1 | k+1 | 0 |
| −k | 0 | 0 | −k |

$\frac{1}{4} \times$ (B)

| | | | |
|---|---|---|---|
| −1 | 0 | 0 | −1 |
| 0 | 3 | 3 | 0 |
| 0 | 3 | 3 | 0 |
| −1 | 0 | 0 | −1 |

$\frac{1}{8} \times$ (C)

| | | | |
|---|---|---|---|
| −2 | 0 | 0 | −2 |
| 0 | 3 | 3 | 0 |
| 0 | 3 | 3 | 0 |
| −2 | 0 | 0 | −2 |

$\frac{1}{4} \times$ (D)

| | | | |
|---|---|---|---|
| −k | k+1 | k+1 | −k |
| 0 | 0 | 0 | 0 |
| 0 | 0 | 0 | 0 |
| 0 | 0 | 0 | 0 |

$\frac{1}{2} \times$ (E)

| | | | |
|---|---|---|---|
| −k | 0 | 0 | 0 |
| k+1 | 0 | 0 | 0 |
| k+1 | 0 | 0 | 0 |
| −k | 0 | 0 | 0 |

$\frac{1}{2} \times$

METHOD AND IMAGE PROCESSING SYSTEM FOR RECONSTRUCTION OF AN IMAGE

TECHNICAL FIELD OF THE INVENTION

The present invention relates generally to a method and image processing system for reconstruction of image and more particularly to a method for reconstruction of image signals such as television signals to obtain an image which has sufficient resolution required to make an original film for use in printing or to make a printing-plate and an image processing system for performing this newly proposed method for reconstruction of image signals.

PRIOR ART

Previously, in the technical field of printing and plate-making, images taken by cameras on photographic films provided therein have been used as originals for printing or making printing-plates.

Recently, however, advancements in electronics have made and significantly increased needs for employing images, which are taken by video cameras, electronic still cameras or the like, and stored in media like magnetic tapes, magnetic disks or the like, or which are restored and transmitted by means of television or the like as the originals for printing or plate-making. Inconveniently, images themselves restored by a television or the like, however, could not be employed as the original because of the fact that such images have been seriously inferior to those taken on the photographic films in the amount of information included therein and image quality. For example, in the case of a television, a standard frame is composed of 525 scanning lines. This scanning density limits the resolution of the image obtained from the television. If a television picture is made up of 512×512 picture elements (or pixels), which are sampled from the frame, and is printed on a photographic film by a laser-beam plotter with its output aperture size of, for instance, 30μ, a picture of approximately 15 mm square is outputted on the photographic film and is too small to be used as the original for printing or plate-making. Namely, image data thus obtained from image signals, which are reproduced by a television and so forth, is usually too small in the number of image signals for use as the original. Therefore, in such a case, to obtain an image with sufficient resolution required for printing or plate-making, it is necessary to reconstruct an image which has sufficient amount of image data by interpolating the image signals originally obtained from a television or the like to increase the number of data of the image signals. For reconstruction of image signals, have been widely used methods employing interpolation of image signals, like a "nearest neighbor method", "bi-lenear method" and "cubic convolution method". The respective conventional methods, however, have problems which will be described hereunder.

In the "nearest neighbor method", it is assumed that image data such as (gray level) densities (corresponding to values indicated by image signals) of pixels nearest to a pixel to be added (or interpolated) to an input image are invariant. Upon applying this method, the value of the image data of an intermediate pixel is estimated to be the same as that of the value of the nearest ones. Therefore, this "nearest neighbor method" is relatively effective in processing line pictures.

Further, in the "bi-linear method", it is assumed that the image data such as density is linearly changed between the nearest pixels. Thus, this method is considered to be effective in processing a picture of a middle tone in which change of image data is gradual and approximately linear.

It is, however, usual that the picture not only has such a portion of a middle tone but also has a high-contrast portion. Thus, these two methods often fail to obtain sufficient results from such usual pictures and, as above stated, can be practically applied only to the limited type of pictures. This is owing to the facts that in these two conventional methods, only the nearest pixels to the pixel to be interpolated are taken into consideration in estimating a value of a pixel to be added (or interpolated) to the middle position thereof and that the correlation between the pixel to be interposed and pixels located on the outer periophery of the nearest pixels is left out of account in these two methods.

On the other hand, the "cubic convolution method" is a process in which coefficients representing the correlation between an additional pixel to be interposed and its respective peripheral sixteen pixels are multiplied by the value of the corresponding pixels and in which the results of the multiplications are summed up to be the value of the additional pixel. As contrasted with the other two conventional methods, this method uses more value of the peripheral pixels of the interposed pixel than the other two methods and thus can take the correlation between the interposed pixel and the peripheral pixels of the nearest pixels into account. This method, however, has a defect in that the above described complex calculation effected using the image data of the sixteen pixels requires much time.

Furthermore, these three conventional methods for performing the interpolation of the image have a drawback in that application of these methods to a usual image often results in an excess of smoothing of the image and the image is thus made unsharp.

SUMMARY OF THE INVENTION

The present invention is accomplished to eliminate the above described drawbacks of the prior arts.

Accordingly, it is an object of the present invention to provide an improved method for reconstruction of an image, in which a process of reconstructing image signals is simpler than the prior arts.

Further, it is another object of the present invention to provide an improved method for reconstruction of an image by which sharpness of the image can be controlled.

Furthermore, it is still another object of the present invention to provide an improved image processing system for performing the improved method of the present invention for reconstruction of an image.

To achieve the foregoing objects and in accordance with a first aspect of the present invention, a method for reconstruction of a first image is provided which includes a step of inputting image data (for example, densities) of at least two pixels (hereunder often referred to simply as "nearest pixels") which are nearest to a position of an additional pixel to be added to the first image and those of pixels (hereunder often referred to simply as "neighbor pixels") located in the direction of or on the extension lines of segments drawn between the position of the additional pixel and that of each of the nearest pixels of which the image data were inputted; and a step of estimating the value of the image data of the additional pixel on the basis of the inputted image data of at least two pairs of the nearest and corresponding neighbor pixels by using an improved method which is newly proposed herein and called "linear extrapolation and average method" and will be described in detail hereinbelow.

Thereby, the quality of the reconstructed image can be significantly improved because the "linear extrapolation and average method" of the present invention takes into account more data of the pixels in the neighborhood of the position, to which an additional pixel is to be interposed, than the conventional "nearest neighbor method" and "bi-linear method". Further, the algorithm of the "linear extrapolation and average method" of the present invention is much simpler than that of the conventional "cubic-convolution method" so that the processing time can be considerably reduced. Furthermore, the sharpness of the reconstructed image can be easily controlled by the "linear extrapolation and average method" of the present invention, because an enhancement coefficient k (which will be described hereinafter) can be arbitrarily changed when performing the method of the present invention.

In accordance with a second aspect of the present invention, an improved image processing system for performing the above described method of reconstruction of an image is provided includes: input means, which having a first memory means, for selecting a desired image from a source of image signals such as a television, a video tape, a video disk, a telecine, a photodisk and the like and for effecting A/D conversion of the image signals of the selected image as occasion demands and for storing the A/D converted image in the first memory means; image enhancement means, having a second memory means, for reading the image data of the pixels of the input image stored in the first memory means, for performing image enhancement processes of the input image and for storing the enhanced image in the second memory means; reconstruction processing means, having a reconstruction processing circuit means and third memory means, for reading the image data of the pixels stored in the second memory and for evaluating image data of additional pixels from the read-out picture data by using the "linear extrapolation and average method" in the reconstruction processing circuit means and for storing the reconstructed image in said third memory means; and output means for outputting the reconstructed image stored in the third memory means.

Thereby, an image with the resolution required for use as original for printing or plate-making can be reconstructed from the input image represented by television signals and so forth.

BRIEF DESCRIPTION OF THE DRAWINGS

The above and other advantages of the present invention will become more apparent in the following description and the accompanying drawings in which like numerals refer to like parts and in which:

FIG. 3(A) is a diagram showing an example of a spacial filter represented by the enhancement coefficient k to be used in evaluating the picture data of the pixel M shown in FIGS. 2(B) and (C) by using the two-dimensional "linear extrapolation and average method";

FIG. 3(B) is a diagram showing the spacial filter of FIG. 3(A) in the case where the enhancement coefficient k is equal to $\frac{1}{2}$;

FIG. 3(C) is a diagram showing the spacial filter of FIG. 3(A) in the case where the enhancement coefficient k is equal to 2;

FIGS. 3(D) and (E) are diagrams showing examples of spacial filters represented by the enhancement coefficient k to be used in evaluating the image data of the pixels R and D shown in FIGS. 2(B) and (C) by using the two-dimensional "linear extrapolation and average method", respectively;

FIGS. 5(A) and (B) are flowcharts of an example of a program for performing the "linear extrapolation and average method"

DETAILED DESCRIPTION OF THE PREFERRED EMBODIMENT:

Before describing in detail a preferred embodiment of the present invention, the "linear extrapolation and average method" will be explained hereinbelow by reference to the accompanying drawings.

Figure 1:
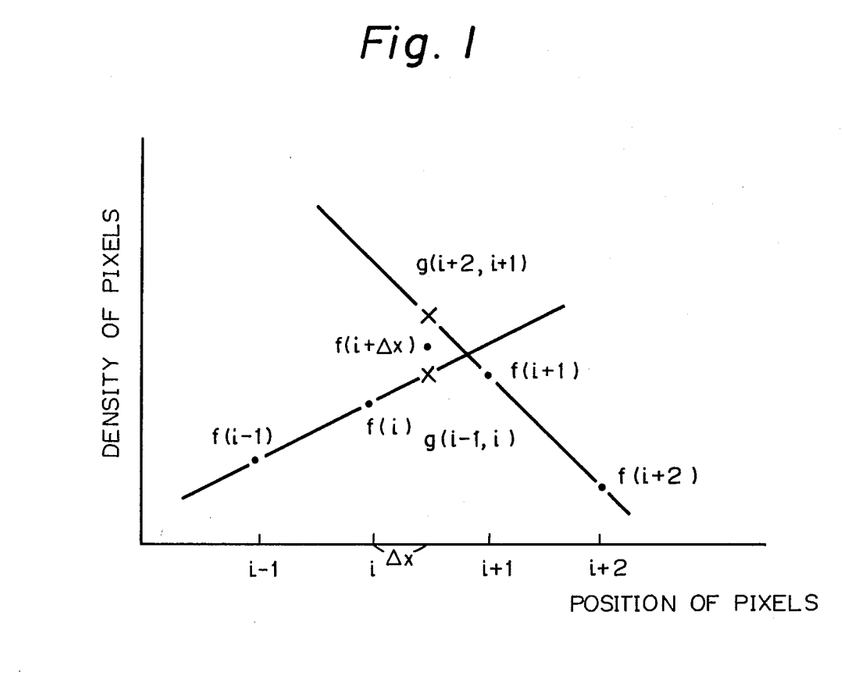
FIG. 1 is a diagram for illustrating the "linear extrapolation and average method" in the case where an input image is -dimensional one.

First, referring to FIG. 1, the technical idea of the "linear extrapolation and average method" will be described hereunder in the case where an input image to be reconstructed by this method is one-dimensional by way of example. In this figure, the abscissas represent positions of pixels of the input image and on the other hand the ordinates represent the gray levels or density of the pixels of the input image. Thus, $f(i-1)$, $f(i)$, $f(i+1)$ and $f(i+2)$ denote the gray level or density of the pixels located at continuous spacial positions $i-1$, $i$, $i+1$ and $i+2$ of the one-dimensional image, respectively. Here, a character "n" designates a positive integer indicating the number of pixels of the input image. Further, a character "i" indicates a positive integer from 2 to $(n-2)$. As an example, a sequence of operations of the "linear extrapolation and average method" in the case of evaluating a value of a density $f(i+\Delta x)$ of an additional pixel to be interposed at an intermediate position $i+\Delta x (0<x<1)$ between the positions $i$ and $i+1$ of the nearest pixels will be described hereinafter. First, an extrapolated value $g(i-1, i)$ is obtained from $f(i-1)$ and $f(i)$ by a linear extrapolation. Similarly, an extrapolated value g(i+2, i+1) is obtained from f(i+2) and f(i+1). Finally, the value f(i+Δx) is determined to be an average of g(i−1, i) and g(i+2, i+1). Hence let $$0 \leq f(i+\Delta x) \leq F$$

where F is the maximum value of the density of the pixels of the input image. The density f(i+Δx) is evaluated by the following equations:

$$
\begin{aligned}
g(i-1,i) &= k(f(i) - f(i-1)) + f(i) & (1)\\
g(i+2,i+1) &= -k(f(i+2) - f(i+1)) + f(i+1) & (2)\\
f(i+\Delta x) &= (1/2)(g(i-1,i) + g(i+2,i+1))\\
&= (1/2)\{(k+1)(f(i) + f(i+1))\\
&\quad - k(f(i-1) + f(i+2))\} & (3)
\end{aligned}
$$

where k denotes a real weighting factor (hereunder often referred to as an enhancement coefficient). As is understood from the equations (1), (2) and (3), if the coefficient k is positive, the evaluation of the value of the density f(i+Δx) by this method is substantially equivalent to enhancement of the value which would be evaluated by the "bi-linear method" from the densities of the nearest pixels. On the other hand, if the coefficient k is negative, such enhancement is negative. Thus, by the "linear extrapolation and average method" of the present invention, the density f(i+Δx) of the additional pixel is evaluated in the above described manner and can be regulated or enhanced to a desired extent by changing the value of the enhancement coefficient k.

Next, the two-dimensional "linear extrapolation and average method" which has been developed by extension of the basic idea of the one-dimensional method above described will be explained in detail hereinbelow by reference to FIGS. 2(A) and (B).

Figure 2:
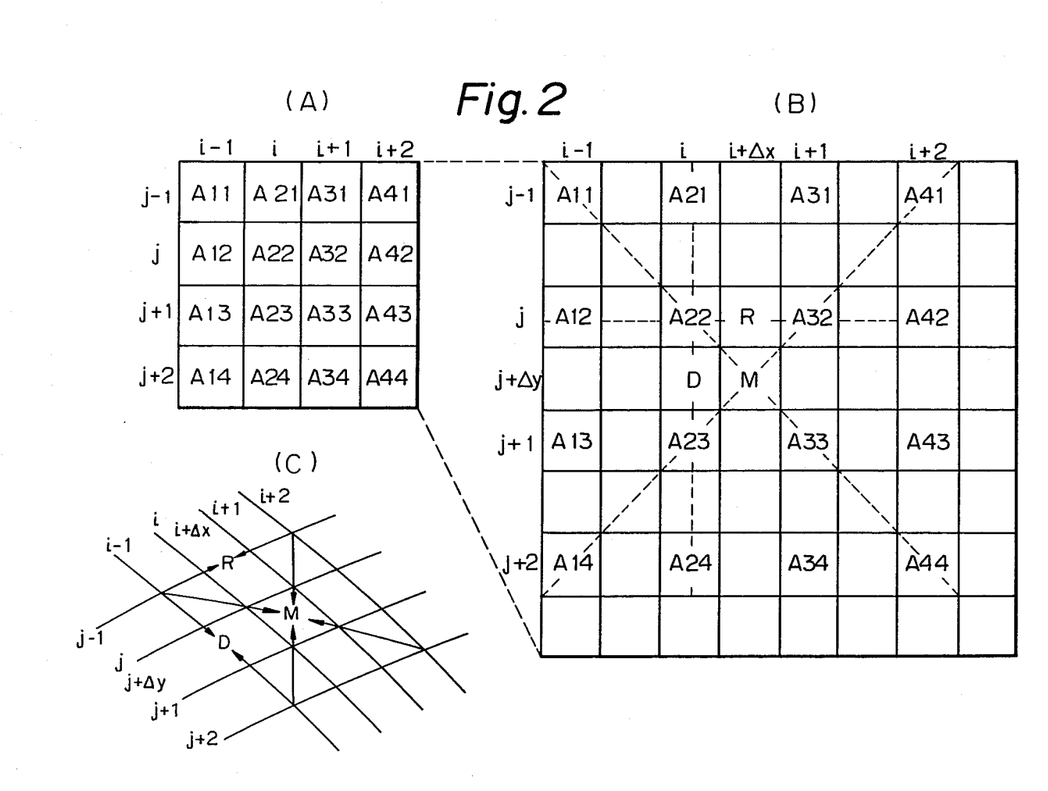
FIG. 2(A) is a diagram showing a portion of an input image to be reconstructed by using a two-dimentional "linear extrapolation and average method"
FIG. 2(B) is a diagram showing a position of a new pixel to be added to the input image and those of the nearest and neighbor pixels in the input image of FIG. 2(A)
FIG. 2(C) is a schematic diagram for illustrating an operation of adding new pixels to the input image by using the two-dimentional "linear extrapolation and average method"

Referring first to FIG. 2(A), there is partly shown a first image or original input image composed of n x m pixels to be reconstructed. Namely, for simplicity of the drawing, in this figure are shown only the pixels of which the abscissas range from (i−1) to (i+2) and the ordinates from (j−1) to (j+2) where $2 \leq i \leq (n-2)$ and $2 \leq j \leq (m-2)$. Further, values of densities f(i−1, j−1), f(i+2, j+2) of the pixels (that is, values indicated by the corresponding image signals) are denoted by $A_{11}$, $A_{44}$, respectively. Further, as an example, FIG. 2(B) describes a case where in the first image shown in FIG. 2(A), additional pixels R, D and M are respectively interposed at the positions (i+Δx, j), (i, j+Δy) and (i+Δx, j+Δy) (where $0<\Delta x<1$, $0<\Delta y<1$) after evaluating their corresponding densities f(i+Δx, j), f(i, j+Δy) and f(i+Δx, j+Δy) by the two-dimensional "linear extrapolation and average method". Further, the values of the densities f(i+Δx, j), f(i, j+Δy) and f(i+Δx, j+Δy) are given by the above equation (3). Namely, first, as to the additional pixel R, extrapolated values of g($A_{21}$, $A_{22}$) and g($A_{23}$, $A_{24}$) are respectively determined from the corresponding sets ($A_{21}$; and $A_{22}$) and ($A_{23}$; and $A_{24}$) of the values $A_{21}$, $A_{22}$, $A_{23}$ and $A_{24}$. Similarly, as to the additional pixel D, extrapolated values of g($A_{12}$, $A_{22}$) and g($A_{32}$, $A_{24}$) are respectively determined from the corresponding sets ($A_{12}$; and $A_{22}$) and ($A_{32}$; and $A_{24}$) of the values $A_{12}$, $A_{22}$, $A_{32}$ and $A_{24}$. Further, as to the additional pixel M, extrapolated values of g($A_{11}$, $A_{22}$), g($A_{14}$, $A_{23}$), g($A_{44}$, $A_{33}$) and g($A_{41}$, $A_{32}$) are respectively determined from the corresponding sets ($A_{11}$; and $A_{22}$), ($A_{14}$; and $A_{23}$), ($A_{44}$; and $A_{33}$) and ($A_{41}$; and $A_{32}$) of the values $A_{11}$, ..., $A_{44}$. Thereafter, the values of the densities of the pixels R and D are determined by the equation (3) from the corresponding extrapolated values as follows:

$$
\begin{aligned}
f(i+\Delta x, j) &= (1/2)(g(A_{21}, A_{22}) + g(A_{23}, A_{24}))\\
&= (1/2)\{(k+1)(A_{21}+A_{23}) - k(A_{21}+A_{24})\}\\
&= (1/2)\{(k+1)(f(i,j)+f(i+1,j))\\
&\quad - k(f(i-1,j)+f(i+2,j))\} & (4)\\
f(i, j+\Delta y) &= (1/2)(g(A_{12}, A_{22}) + g(A_{32}, A_{42}))\\
&= (1/2)\{(k+1)(A_{22}+A_{32}) - k(A_{12}+A_{42})\}\\
&= (1/2)\{(k+1)(f(i,j)+f(i,j+1))\\
&\quad - k(f(i,j-1)+f(i,j+2))\} & (5)
\end{aligned}
$$

where F is assumed to be the maximum value of the densities of the pixels. Thus, the ranges of the densities f(i+Δx, j) and f(i, +Δy) are as follows:

$$0 \leq f(i+\Delta x, j) \leq F \text{ and } 0 f(i, j+\Delta y) \leq F.$$

Further, the density f(i+Δx, j+Δy) of the pixel M can be obtained by combining two or more of the four extrapolated values g($A_{11}$, $A_{22}$), g($A_{14}$, $A_{23}$), G($A_{44}$, $A_{33}$) and G($A_{41}$, $A_{32}$) and averaging the combined values. For example, in the case of combining two of these extrapolated values, the following six values $M_1$, $M_2$, $M_3$, $M_4$, $M_5$, and $M_6$ can be introduced as the value of the density of the additional pixel M:

$$
\begin{aligned}
M_1 &= (1/2)(g(A_{11}, A_{22}) + g(A_{44}, A_{33}))\\
M_2 &= (1/2)(g(A_{14}, A_{23}) + g(A_{41}, A_{32}))\\
M_3 &= (1/2)(g(A_{11}, A_{22}) + g(A_{14}, A_{23}))\\
M_4 &= (1/2)(g(A_{14}, A_{23}) + g(A_{44}, A_{33}))\\
M_5 &= (1/2)(g(A_{44}, A_{33}) + g(A_{41}, A_{32}))\\
M_6 &= (1/2)(g(A_{41}, A_{32}) + g(A_{11}, A_{22}))
\end{aligned}
$$

However, in order to obtain a value of greater reliability as that of the density of the additional pixel, it is necessary to take as many of the peripheral pixels of the additional pixel as possible into account. Therefore, in this case, it is desirable to evaluate the value of the density of the additional pixel by averaging all the four extrapolated values. Namely, the most desirable value of the density f(i+Δx, j+Δy) is given as follows:

$$
\begin{aligned}
f(i+\Delta x, j+\Delta y) &= (1/4)(g(A_{11}, A_{22}) + g(A_{14}, A_{23})\\
&\quad + g(A_{44}, A_{33}) + g(A_{41}, A_{32})) & (6)\\
&= (1/4)\{(k+1)(A_{22} + A_{23} + A_{33} + A_{32})\\
&\quad - k(A_{11} + A_{14} + A_{44} + A_{41})\} & (7)\\
&= (1/4)\{(k+1)(f(i,j) + f(i,j+1)\\
&\quad + f(i+1,j+1) + f(i+1,j))\\
&\quad - k(f(i-1,j-1) + f(i-1,j+2)\\
&\quad + f(i+2,j+2) + f(i+2,j-1))\} & (8)
\end{aligned}
$$

where $0 \leq f(i+\Delta x, j+\Delta y) \leq F$. However, the number of the extrapolated values used to evaluate the value of the density f(i+Δx, j+Δy) may be appropriately chosen from 2, 3 and 4 according to the type of the input image, the throughput of the processing system and so on. FIG. 2(C) is a schematic diagram illustrating the foregoing processes of evaluating the densities of the additional pixels R, D and M.

Thus, the values of the density of the additional pixels are finally evaluated by substituting the actual values of the density of the nearest and neighbor pixels for the corresponding variables in the equations (4), (5) and (8).

In the above descriptions and drawings of FIGS. 2(A) and (B), the positions of all of the additional pixels R, D and M are assumed to be within the part of the input image as shown in FIG. 2(A). Thus, as above stated, the ranges of the variables "i" and "j" are assumed to be as follows:

$2 \leq i \leq (n-2)$ and $2j \leq (m-2)$.

However, in the above case of reconstructing the first or input image composed of n×m pixels by using the two-dimensional "linear extrapolation and average method", if only the additional pixel, for example, R is interposed at the position as shown in FIG. 2(A), the equation (4) is applicable within the following ranges of the variables "i" and "j":

$2 \leq i < (n-2)$ and $2 \leq j \leq m$.

Further, if only the pixel D is interposed as shown in FIG. 2(A), the ranges of the variables "i" and "j", where the equation (5) is valid, are as follows:

$2 \leq i < (n-2)$ and $1 < j \leq m$.

Moreover, if only the pixel M is added to the first image, the equation (8) is valid within the ranges of these variables given by:

$2 \leq i < (n-2)$ and $2j < (m-2)$.

Furthermore, in the case of applying the above described method of the present invention to the first image on an assumption that an additional row and column of pixels are provided outside the first image, as will be described by reference to flowcharts of FIGS. 6(A) and (B), the equations (4), (5) and (8) are respectively valid within the corresponding ranges (i), (ii) and (iii) of the variables "i" and "j" described as follows:

| (i)   | $1 < i < n$ and $1 \leq j \leq m$; |
| (ii)  | $1 \leq i \leq m$ and $1 < j < m$; and |
| (iii) | $1 < i < n$ and $1 < j < m$ |

Incidentally, the above equation (8) can be represented by use of the following operator:

$$(\tfrac{1}{4}) \times \begin{vmatrix} -k & 0 & 0 & -k \\ 0 & k+1 & k+1 & 0 \\ 0 & k+1 & k+1 & 0 \\ -k & 0 & 0 & -k \end{vmatrix} \quad (9)$$

Figure 3:
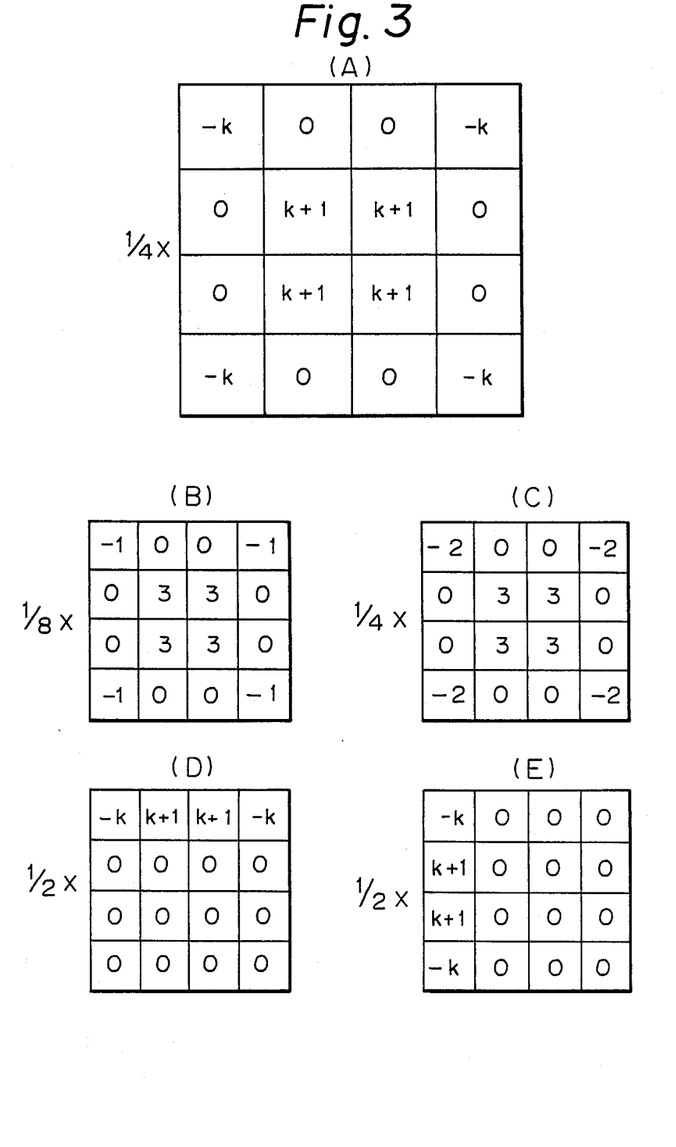

Accordingly, when performing the "linear extrapolation and average method" of the present invention, values of the density of the additional pixels to be interposed between pixels of an input image can be efficiently evaluated by effecting operations on filters (hereunder referred to simply as spacial filters) represented in terms of the enhancement coefficicent k as shown in FIG. 3(B) and two-dimensional arrays or matrices (hereunder referred to as windows) in which densities of pixels are held as their components or elements. Further, the extent of the image enhancement in a second image or reconstructed image can be easily controlled by preliminarily preparing a plurality of the spacial filters in respective of which different values are substituted for the enhancement coefficient k and selectively using the filters in the enhancement processing. For example, FIGS. 3(B) and (C) shows spacial filters in which the values of the enhancement coefficient k is $\tfrac{1}{2}$ and 2, respectively. Similarly, the spacial filters shown in FIGS. 3(D) and (E) can be used in calculation using the equations (4) and (5).

Further, in the case where the first image is composed of n rows and m columns (the term "a row" means a line extending in the direction of the horizontal (X) axis and the term "a column" means a line extending in the direction of the vertical axis (Y)) of the pixels, that is n×m pixels, the above described "linear extrapolation and averaging method" uses the density of the nearest pixels on the 2 rows and 2 columns surrounding the position at which an additional pixel is to be interposed. Hence, even the "linear extrapolation and average method" sometimes fails to add to additional pixels to positions located between either one of the two terminal rows and its adjoining row of the pixels or between either one of the two terminal column and its adjoining column of the pixels. However, a first image obtained by sampling the actual television signals and so forth and stored in a secondary memory unit is usually composed of about 500×500 pixels. Therefore, if no pixels is added to a portion (hereunder often referred to simply as a peripheral portion) placed between either one of the two terminal rows and its adjoining row of the pixels or between either one of the two terminal columns and its adjoining column of the pixels, there will occur no practical matters or problems. If it is necessary to add new pixels to the peripheral portion, it is apparent to those skilled in the art that the above described one-dimensional ×linear extrapolation and average method", the conventional "nearest neighbor method", the "bi-linear method" or the "linear extrapolation method" can be used to perform such a processing (hereunder referred to simply as a peripheral reconstruction processing) of inserting the new pixels into the peripheral portion.

Further, the above described "linear extrapolation and average method" according to the present invention can be applied to the peripheral portion of the first image on an assumption that there are additional pixels outside the peripheral portion and that densities of such additional pixels have specific values.

Incidentally, it should be noted that the repetition of performing the "linear extrapolation and average method" of the present invention to an input image can provide a reconstructed image which contains many pixels. For example, a new pixel is first interposed between each pair of adjoining pixels of a first input image by using the method of the present invention. Thereafter, by applying the method of the present invention again to the thus obtained second input image, a reconstructed image containing more pixels than the first input image can be provided. By repeating such processes the required number of times, the reconstructed image containing a sufficient number of pixels is finally obtained as stated above.

Moreover, it should be also noted that an arbitrary value can be selected and substituted for the enhancement coefficient k in each of the repeated processes, thereby obtaining a reconstructed image with a desired sharpness.

As stated above, the image processing system for performing the above described method of the present invention includes:

an input means having a first memory, for selecting a desired image from a source of image signals such as a television, a video tape, a video disk, a telecine, a photodisk and the like and for effecting A/D conversion of the image signals of the selected image as occasion demands and for storing the A/D converted image in the first memory;

an image enhancement means having a second memory, for reading the image signals the input image stored in the first memory, for performing image enhancement processes, (for instance, a smoothing processing, a correction of an aspect ratio, a correction of gray levels and so on) of the input image and for storing the enhanced image in the second memory;

a reconstruction processing means having a reconstruction processing circuit and a third memory, for reading the image signals of enhanced image stored in the second memory and for evaluating image signals of additional pixels from the read-out image signals by using the "linear extrapolation and average method" in the reconstruction processing circuit and for storing the reconstructed image in the third memory; and an output means, for outputting the reconstructed image stored in the third memory.

Hereafter, the image processing system according to the present invention will be more concretely and described in detail by reference to the accompanying drawings.

Figure 4:
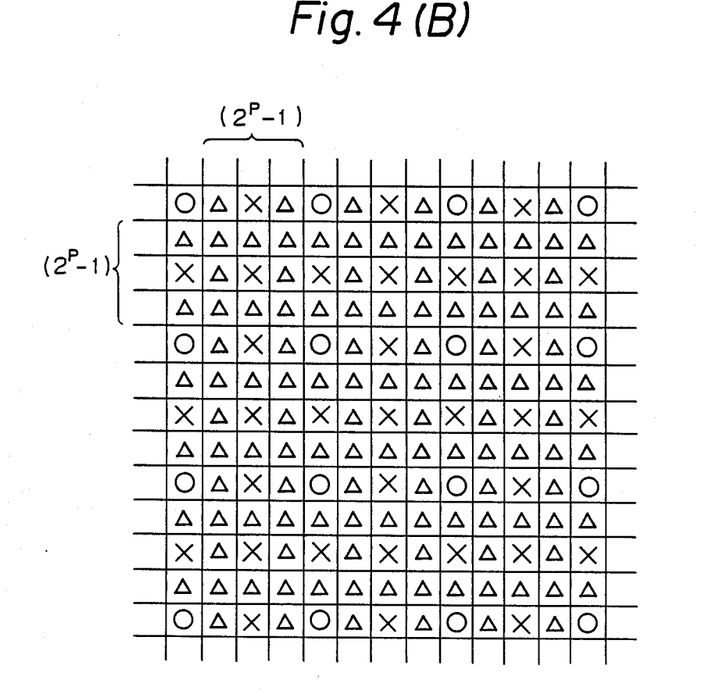
FIG. 4(A) is a schematic block diagram showing a structure of a system for performing the method of the present invention for reconstruction of an input image.
FIG. 4(B) is a diagram showing a resultant image which is obtained by repeatedly applying the two-dimensional "linear extrapolation and average method" to an input image twice.
Figure 4A:
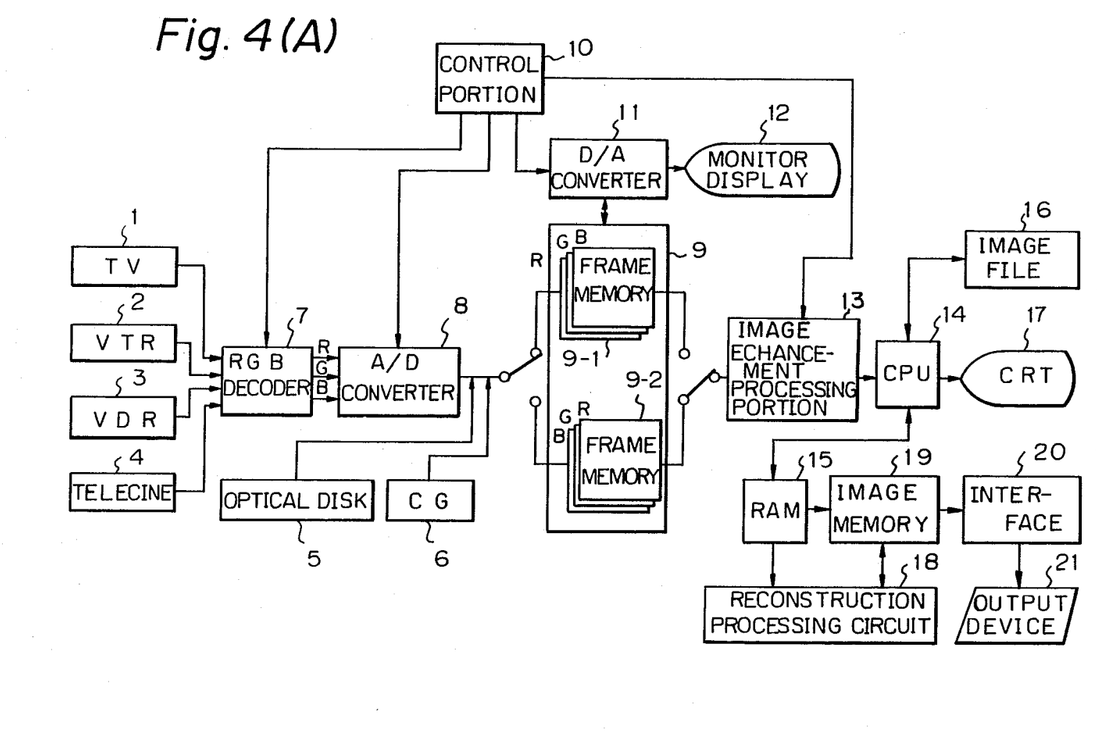

Referring now to FIG. 4, there is shown a preferred example of the image processing system of the present invention.

As shown in this figure, television signals (TV signals) 1 from a television, video signals (VTR signals) 2 from a video tape recorder (VTR), video signals (VDR signals) 3 from an electronic still camera or a laser disk and telecine signals 4 obtained from a film, a slide or a telop by way of a telecine unit are used as input image signals to the image processing system. Hereunder, for simplicity of the description, the TV signal, the VTR signal, the VDR signal and the telecine signal and the like will be referred to generically as TV signals. These TV signals are analog signals that these TV signals can be quantized or digitalized by an A/D converter 8 and are stored in a memory (hereafter often referred to as a "frame memory") 9 as signals provided with their own addresses. On the other hand, digital signals from an optical disk memory 5 or computer graphics (CG) system 6 or the like can be input signals and are stored in the frame memory 9 The digitalized input signals are stored in either one of the frame memories 9-1 and 9-2 which is not being used in the succeeding processing, for example, the frame memory 9-2 as shown in FIG. 4(A). Further, a control portion 10 appropriately selects the input signal and the frame memory. A D/A converter 11 and a monitoring display device 12 are used to display an image represented by the signals stored in the frame memory on a screen of the display device 12.

Thereafter, the input signals stored in the frame memory 9-2 are supplied into the enhancement processing portion 13. During this, the next image signals are stored in the other frame memory 9-1 under control of the control portion 10. In the above described manner, the frame memories 9-1 and 9-2 are alternately switched with each other and used for storing the image signals thereinto. In the case where many image signals are stored in the memories in parallel, a required number of "frame memories" can be provided in the image processing system.

If the TV signals are color image signals, the TV signals are first separated by a RGB decoder 7 into R signals, G signals and B signals. Next, these R, G and B signals are converted by the A/D converter 8 into digital signals and further stored in each of the corresponding frame memories.

In the case of the input image signals such as the TV signals as described above, the image signals of the input image are stored, for example, in the form of data of the density, each of which is 8 bits in depth, (that is, the density has 256 gray levels) in the addresses (corresponding to the respective pixels of the input image) of the frame memory which contains, for instance, 512×512 addresses.

Next, in the image enhancement processing portion 13, any processing required for enhancement of the image is performed on the image signals of the image stored in the memory 9. Namely, the required processings such as the smoothing processing, the correction of the aspect ratio, the modification of the gray levels of the pixels and so on are performed to the data of the density of the pixels read out of the memory 9. The processed data are succeedingly sent to a randam-access memory (RAM) 15 by way of a central processing unit (CPU) 14 and stored in the RAM 15. If need aries, a file (hereunder often referred to as an image file) 16 of the processed data can be created in a floppy disk, a disk unit or the like instead of being stored in the RAM 15. Furthermore, the processed data can be visualized and inspected by being displayed on a screen of a CRT display device 17 if necessary.

Thereafter, the processing of reconstruction of the image is performed in a reconstruction processing circuit 18 to data read from the RAM 15 or the image file 16 by using the above described "linear extrapolation and average method". Further, fast processing of the reconstruction of the image can be realized by employing a fast-processing unit such as an image pipeline processor in addition to the normal CPU 14. Thus, image data or densities of new pixels to be added to the input image are evaluated by executing the "linear extrapolation and average method" to the data read out of the RAM 15 in the reconstruction processing circuit 18 and are further stored in a secondary memory (hereafter referred to as image memory) 19 in sequence.

Furthermore, it is preferable for efficiently storing the image data of the pixels in the image memory 19 to preliminarily take into account the number of pixels contained in the finally reconstructed image of which the image data will be finally outputted to the memory 19, that is, to know how many times the image to be finally obtained is larger in the number of pixels than the first image. Thus, assuming that a character "p" represents the number of times at which the above described processing of reconstruction of an input image is performed, the pixels of the first input image are preferably positioned in an address space of the image memory 19 in such a manner that the adjoining pixels thereof are spaced apart $(2^p-1)$ addresses or locations from each other in the horizontal and vertical directions, as viewed in FIG. 4(B). That is, this figure describes the manner of placing the pixels of the first and reconstructed images in the address space of the memory 19 in the case where the reconstruction processing employing the "linear extrapolation and average method" is repeatedly performed to the input image only twice as an example. In this figure, a white circle o denotes a position of each pixel of the first image. Further, in this case, the reconstruction processing is effected twice as described above and accordingly the above variable p equals 2. Therefore, the data of the adjoining pixels of the first image are stored at space of 3 $(=2^2-1)$ locations in the memory 19 as shown in FIG. 4(B). On the other hand, in this figure, x indicates a position of each additional pixel of a first reconstructed image, which pixels is added to the first image by effecting the "linear extrapolation and average method" only time thereto. Moreover, a white triangle Δ indicates a position of each pixel of a finally obtained image, which pixel is added to the first reconstructed image by effecting the method of the present invention again thereto, that is, by performing the method of the present invention twice to the first image.

The above described arrangement of the original and additional pixels in the address area of the image memory 19 can provides a remarkable efficiency in processing of reconstruction of the image.

After having repeatedly performed the reconstruction processing the number of times required for obtaining a reconstructed image which contains a sufficient number of pixels, the image data of the finally obtained image stored in the image memory 19 is outputted to a medium, for example, a photographic film, a photographic paper or the like by way of an output portion 21 which is usually a laser-beam plotter and so on. However, and output part of a scanner may be used as the output portion 21 of the image processing system. Further, if a buffer memory and the like is provided with the output portion 21, the image data can be temporarily stored in the buffer memory and thereafter outputted therefrom. Moreover, if a half-tone image for printing and so forth is needed, the reconstructed image stored in the image memory 19 can be transformed into the half-tone by any means well known to those skilled in the art and further outputted to a photographic film and so on.

Figure 5:
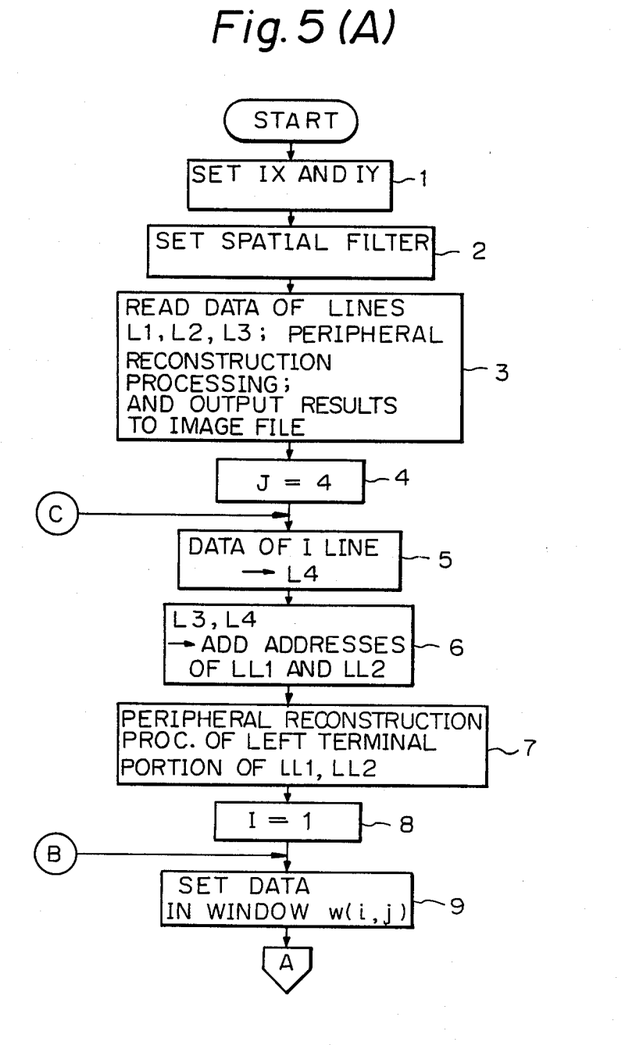
Figure 5B:
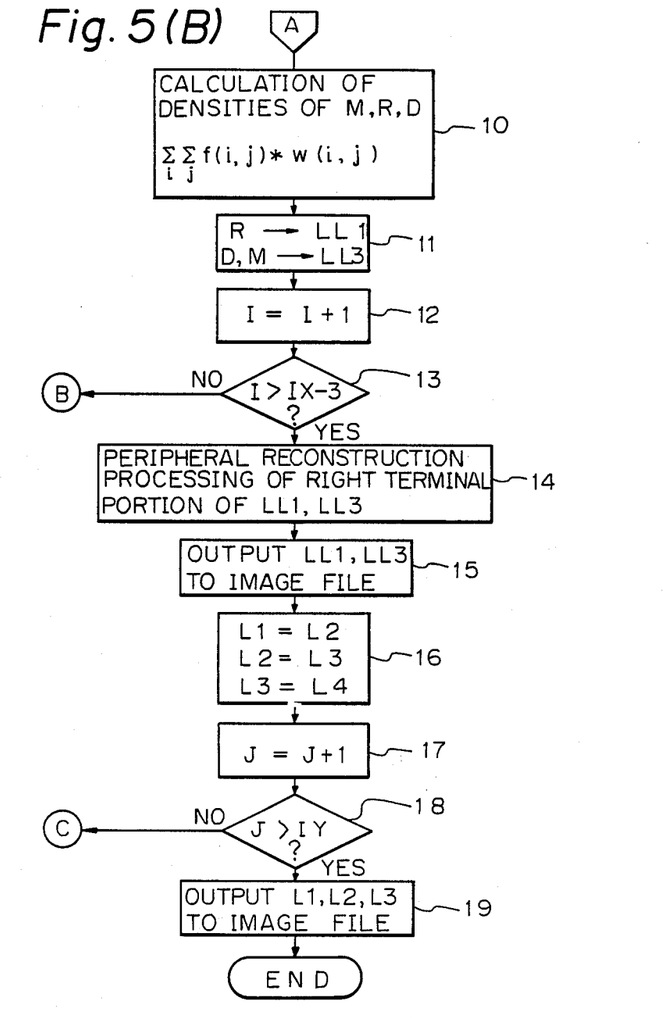

FIGS. 5(A) and (B) are flowcharts showing an example of a program for performing the "linear extrapolation and average method" by using the system shown in FIG. 4(A).

First, referring to FIG. 5(A), the number of the pixels aligned in a row, (that is, in the horizontal axis (X axis), as viewed in this figure) and that of the pixels aligned in a column, (that is, in the vertical axis (Y axis), as viewed in this figure) of the first image are respectively set in variables IX and IY as initial values in step 1. Further, predetermined values are set in the spacial filters in step 2.

Next, the program advances to step 3, whereupon the image data of the pixels of a first thru third columns of the first image are read out of the RAM 15 and set in one-dimensional arrays L1, L2 and L3, respectively. Further, the above described peripheral processing is performed by using the conventional one-dimensional extrapolation method and so on to the peripheral portion and the resultant data are outputted to the image memory 19. The programs then sets an initial value 4 in a variable J indicating a column number of a column of the first image, of which the data of the pixels of the column are to be read from the RAM 15, in step 4. Thereafter, in step 5, the image data or densities of the pixels of a Jth column are read from the RAM 15 and are set into a one-dimensional array L4. Further, the programs enters step 6, whereupon the data held in each of elements of the array L3 is read therefrom and put into an element of a corresponding odd address in a one-dimensional array LL1 which has twice as many elements as the array L3, that is, which is twice the length of array L3 in length. Similarly, the data held in each of elements of the array L4 is put into an element of a corresponding odd address in a one-dimensional array LL2 which is similarly twice the length of array L4

Then, the program proceeds to next step 7, whereupon the peripheral processing is performed by the conventional one-dimensional extrapolation method and so on to an element of the lowest address and that of its next address of the arrays LL1 and LL2. Next, a value of a variable I representing a row number is set to be 1 (step 8). Further, the image data are set in a window w(i,j) (step 9). The three types of the special filters as shown in FIGS. 3(A), (D) and (E) are operated on the image data of the window and thereby the densities of the additional pixels R, D and M shown in FIG. 2(B) are evaluated in step 10. The evaluated density of the pixel R is then put into an element of an even address in the LL1 and on the other hand the densities of the pixels D and M are put into a one-dimensional array LL3 which is twice the array L3 in length (step 11). Thereafter, the value of the variable I is incremented by one (step 12) and further compared to the value of (IX−3) (step 13). If the former or variable I is less than or equal to the latter (IX−3), the program goes back to the step g If the former is larger than the latter, the peripheral processing is performed to an element of the highest or last address and that of the last but one address in the arrays LL1 and LL3 (step 14) and the results of this is outputted to the image memory 19 (step 15). Subsequently, the respective data held in the arrays L1, L2 and L3 are respectively exchanged with those held in the arrays L2, L3 and L4 at the same time (step 16). Thereafter, the value of the variable J is incremented by one (step 17). Further, in step 18, the variable J is compared with the variable IY. If the former is less than or equal to the latter, the program goes back to the step 5. If the former is larger than the latter, the data held in the arrays L1, L2 and L3 are outputted to the image memory 19 (step 19).

Figure 6A:
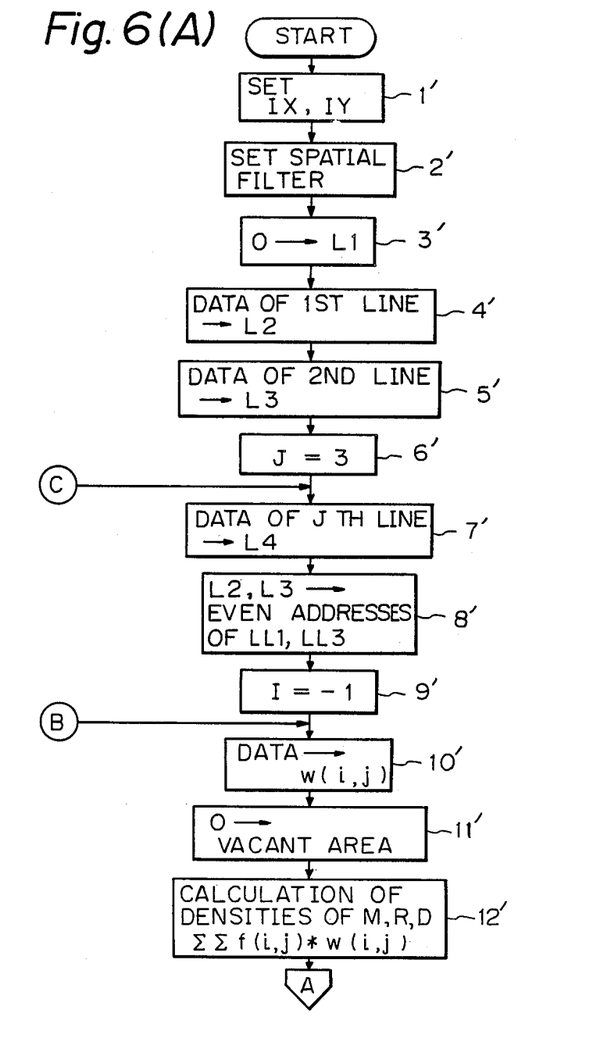
FIGS. 6(A) and (B) are flowcharts of an example of a program for performing the "linear extrapolation and average method" in the case where additional pixels are evaluated by this method and added to a periphery of the input image.
Figure 6B:
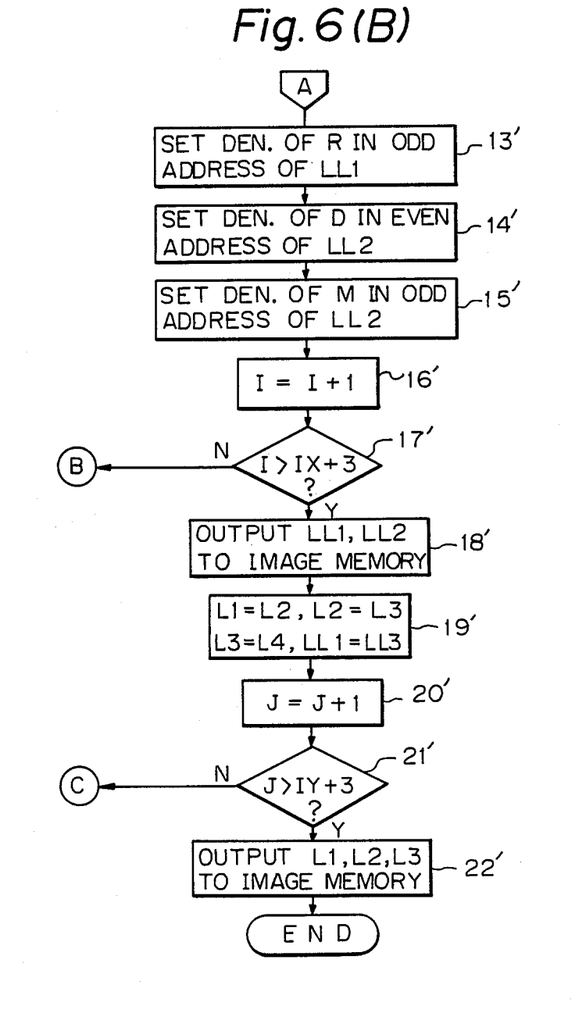

FIGS. 6(A) and (B) are flowcharts of an example of a program for performing the reconstruction processing of the first image according to the present invention in the case where the "linear extrapolation and average method" is performed to the peripheral portions of the first image. In steps 1' and 2' of FIG. 6(A), the same processings are effected as in the steps 1 and 2 of FIG. 5(A), respectively.

Further, the program enters step 3', whereupon the array L1 is filled with zeros, assuming that there are additional pixels with density 0 outside the first column of the first image. Then, the image data of the first and second columns of the first image are read from the RAM 15 and put into arrays L2 and L3, respectively (steps 4' and 5'). Thereafter, a variable J representing a column number is initially set to be 3 (step 6'). Further, the image data of a Jth column are read from the RAM 15 and put into the array L4 (step 7'). Furthermore, in step 8', the image data held in each elements of the array L2 are put into an element of an even address in the array LL1 which is twice the length of array L2. On the other hand, in this step, the image data held in the array L3 is put into an element of an odd address in the array LL3 which is twice the array L3 in length. Then, a variable I representing a row number is set to be −1 (step 9'). Further, the image data are set in a window w(i,j) (step 10'). In the case where that there is no image data to be set in the window, the window is filled with zero (step 11'). As is similar in step 10 of FIG. 5(B), the three types of the spacial filters are operated on the image data of the window and thereby densities of the additional pixels R, D and M are evaluated in step 12'. The evaluated density of the pixel R is then put into an element of an odd address in the array LL1 (step 13'). On the other hand, the density of the pixel D is put into an element of an even address in a one-dimensional array LL2 which is twice length of array L2 in length (step 14') and the density of the pixel M into an element of an odd address in the array LL2 (step 15'). Thereafter, the value of the variable I is incremented by one (step 16') and is then compared with the value of the equation (IX+3) (step 17'). If the former or variable I is less than or equal to the latter (IX+3), the program goes back to the step 10'. If the former is larger than the latter, the contents of the arrays LL1 and LL2 are outputted to the image memory 19 (step 18'). Thereafter, the respective data held in the arrays L1, L2, L3 and LL1 are respectively exchanged with those held in the arrays L2, L3, L4 and LL3 at the same time (step 19'). Further, the variable J is incremented by one (step 20') and, in step 21', the variable J is compared with the equation (IY+3). If the former is less than or equal to the latter, the program goes back to the step 7'. If the former is larger than the latter, the data held in the arrays L1, L2 and L3 are outputted to the image memory 19 (step 22').

As a result of performing the above described operations, a second image, which contains more pixels than the first image, can be obtained. If there is a need for of obtaining a third image which has more pixels than the second image does, such a third image can be obtained by performing the above described reconstruction processing to the second image. Thus, by repeating the reconstruction processing of an input image, a final image can be provided which contains desired number of the pixels.

While the invention has been described in its preferred embodiment, it should be understood that the words which have been used are words of description rather than limitation and that changes and variations may be made without departing from the spirit or scope of the appended claims.

What is claimed is:

1. A method for reconstruction of a first image composed of n×m pixels to obtain a second image composed of more than n×m pixels, said first image having n pixels in the direction of X axis and m pixels in the direction of Y axis, said method includes:
   (i) a step of inputting image data of at least two nearest pixels which are nearest to a position $(i+\Delta x, j+\Delta y)$ $[1 \leq i \leq n;$ and $1 \leq j \leq m$ with the exception that $i=n$ and $j=m$, $0 \leq \Delta x < 1;$ and $0 \leq \Delta y < 1$ with the exception that $\Delta x = \Delta y = 0$] of an additional pixel to be added to the imput image and those of neighbor pixels located on extension lines of segments drawn between the position of the additional pixel and that of each of the nearest pixels of which the image data being inputted;
   (ii) a step of estimating the value of the image data of the additional pixel on the basis of the inputted image data of at least two pairs of the nearest and corresponding neighbor pixels by using a linear extrapolation and average method.

2. The method as set forth in claim 1 wherein
a first group of sets of the positions of said nearest and corresponding neighbor pixels whose image data being inputted for estimating the image data at a first position $(i+\Delta x, j+\Delta y)$ $[2 \leq i < (n-2);$ and $2j < (m-2)$, and $0 < \Delta x < 1;$ and $0 < \Delta y < 1$] of an additional pixel is made up of at least two sets chosen from the following sets (a), (b), (c) and (d) of the positions of the pixels:
   (a) $(i, j)$ and $(i-1, j-1)$;
   (b) $(i, j+1)$ and $(i, j+2)$;
   (c) $(i+1, j+1)$ and $(i+2, j+2)$; and
   (d) $(i+1, j)$ and $(i+2, j-1)$ and wherein
a second group of sets of the positions of said nearest and corresponding neighbor pixels whose image data being inputted for estimating the image data at a second position $(i+\Delta x, j)$ $[2 \leq i < (n-2);$ and $1 \leq j \leq m$, and $0 < \Delta x < 1$] of an additional pixel is made up of the following two sets (e) and (f) of the positions of the pixels:
   (e) $(i-1, j)$ and $(i, j)$; and
   (f) $(i+1, j)$ and $(i+2, j)$ and wherein
a third group of sets of the positions of said nearest and corresponding neighbor pixels whose image data being inputted for estimating the image data at a third position $(i, j+\Delta y)$ $[1 \leq i \leq n;$ and $2 \leq j < (m-2)$, and $0 < \Delta y < 1$] of an additional pixel is made up of the following two sets (g) and (h) of the positions of the pixels:
   (g) $(i, j-1)$ and $(i, j)$: and
   (h) $(i, j+1)$ and $(i, j+2)$.

3. The method as set forth in claim 1 wherein
a group of sets of the position of said nearest and corresponding neighbor pixels whose image data being inputted for estimating the image data at a position $(i+\Delta x, j+\Delta y)$ $[2 \leq i < (n-2);$ and $2 \leq j < (m-2), 0 < \Delta x < 1:$ and $0 < \Delta y < 1$] of an additional pixel is made up of at least three sets chosen from the following sets (a), (b), (c) and (d) of the positions of the pixels:
   (a) $(i, j)$ and $(i-1, j-1)$;
   (b) $(i, j+1)$ and $(i, j+2)$;
   (c) $(i+1, j+1)$ and $(i+2, j+2)$; and
   (d) $(i+1, j)$ and $(i+2, j-1)$.

4. An image processing system for obtaining an image with high resolution from a television signals and so on includes:
   input means, having a first memory means, for selecting a desired image from a source of image signals such as a television, a video tape, a video disk, a telecine, a photo-disk and the like and for effecting A/D conversion of the image signals of the selected image as occasion demands and for storing the A/D converted image in said first memory means;
   image enhancement means, having a second memory means, for reading the image data of the pixels of the input image stored in said first memory means, for performing image enhancement processes of the input image and for storing the enhanced image in said second memory means
   reconstruction processing means, having a reconstruction processing circuit means and third memory means, for reading the image data of the pixels stored in the second memory means and for evaluating image data of additional pixels from a read-out image data by using the linear extrapolation and average method in said reconstruction processing circuit means and for storing the reconstructed image in said third memory means; and
   output means for outputting the reconstructed image stored in said third memory means.

* * * * *